Nov. 2, 1948.   C. E. CLAPPER   2,452,834
HOT AIR DEFLECTOR FOR TRACTORS
Filed March 17, 1945  2 Sheets-Sheet 1

INVENTOR,
Clyde E. Clapper.
BY Roy E. Hamilton,
Attorney.

Nov. 2, 1948. C. E. CLAPPER 2,452,834
HOT AIR DEFLECTOR FOR TRACTORS
Filed March 17, 1945 2 Sheets-Sheet 2
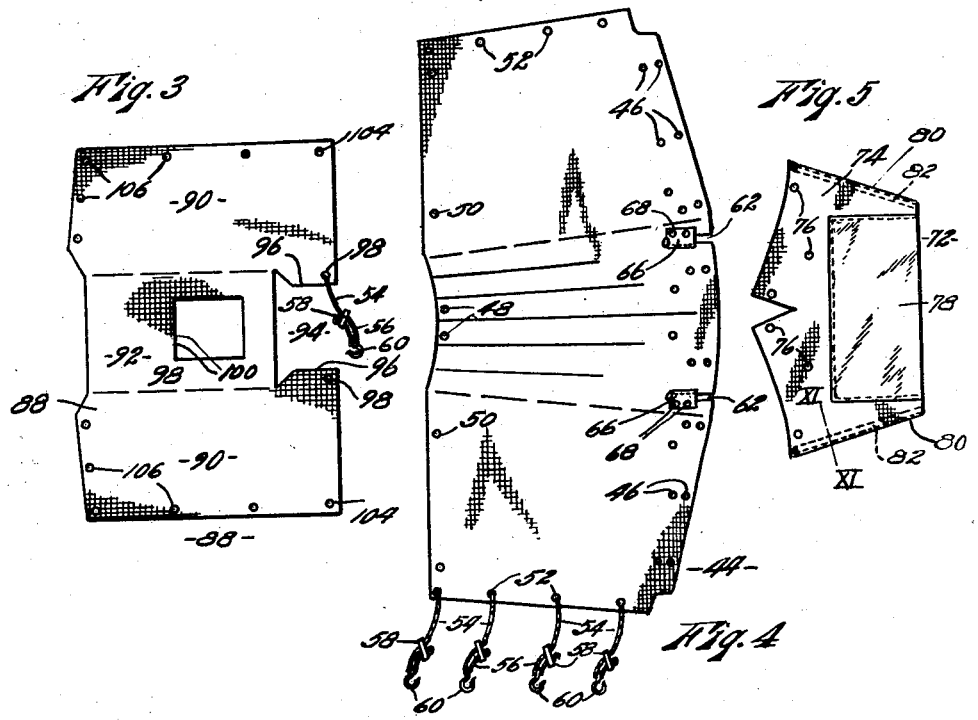
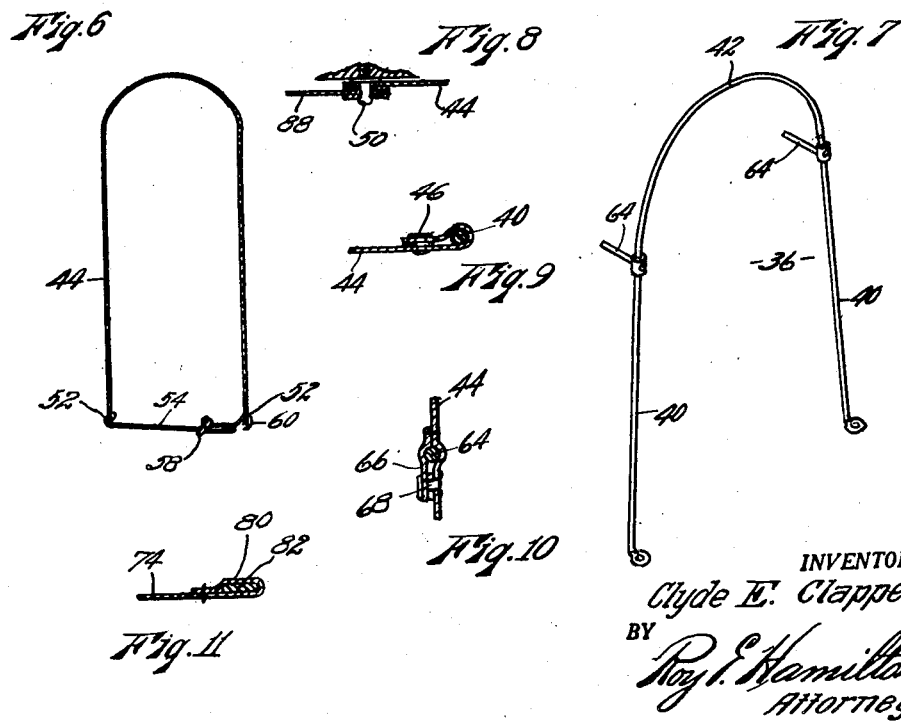
INVENTOR,
Clyde E. Clapper.
BY Roy E. Hamilton,
Attorney.

Patented Nov. 2, 1948

2,452,834

UNITED STATES PATENT OFFICE 2,452,834

HOT-AIR DEFLECTOR FOR TRACTORS

Clyde E. Clapper, Kansas City, Mo.

Application March 17, 1945, Serial No. 583,345

16 Claims. (Cl. 180—54)

1

This invention relates to hot air deflectors for tractors and has particular reference to a deflector suitable for use on the conventional type of farm tractor having an open frame whereby the heat from the engine is normally dissipated from the sides thereof.

In cold weather the tractor operator is not normally benefited by the heat generated by the tractor engine due to the fact that it is dissipated upwardly before it reaches the operator when seated in the normal position on the tractor.

The principal object of the present invention is to provide means whereby the heated air from the engine and its associated parts is deflected so as to contact and warm the operator of the tractor.

Another object of this invention is the provision of a hot air deflector having means adjustable to regulate the flow of heated air from the engine to the operator.

Other objects are simplicity and economy of construction, ease and speed of mounting, and adaptability for use on the various types of conventional farm tractors.

With these objects in view, as well as other objects, which will appear during the course of the specification, reference will now be had to the drawing, wherein:

Fig. 3 is a stretch-out of the front deflector member.

Fig. 4 is a stretch-out view of the rear deflector member.

Fig. 5 is a stretch-out view of the detachable windshield section of the deflector.

Fig. 6 is a cross sectional view of the deflector taken on line VI—VI of Fig. 1.

Fig. 7 is a detached perspective view of the inverted U-shaped rod supporting member.

Fig. 8 is a fragmentary, sectional view taken on line VIII—VIII of Fig. 1.

Fig. 9 is a cross sectional view taken on line IX—IX of Fig. 1.

Fig. 10 is a fragmentary, sectional view taken on line X—X of Fig. 1.

Fig. 11 is an enlarged sectional view taken on line XI—XI of Fig. 3.

Throughout the several views like reference characters refer to similar parts and the numeral

2

Figure 1:
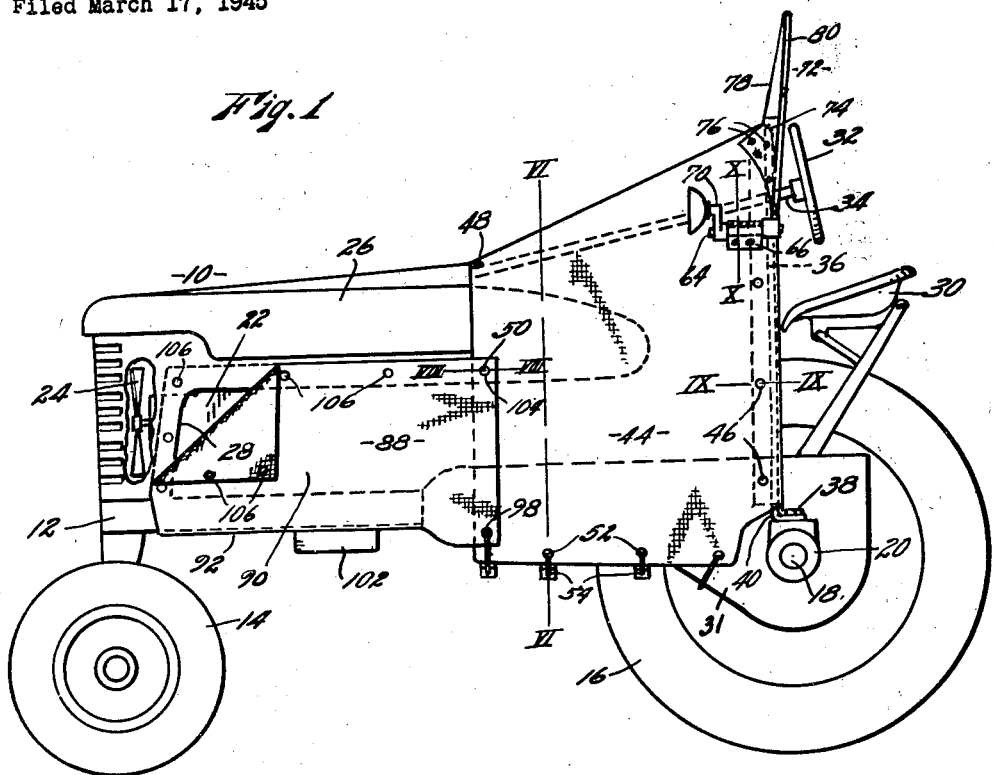
Figure 1 is a side elevation of a hot air deflector shown in combination with a farm tractor with parts dotted and parts broken away, embodying this invention.

10 designates a tractor of the conventional type suitable for farm use having a frame 12 mounted on front wheels 14 and rear wheels 16, said rear wheels being mounted on axles 18 adjustably mounted in axle housings 20. Frame 12 carries an engine 22 which powers the tractor and drives an air circulating fan 24 which draws air through the radiator and forces it rearwardly over the engine. Frame 12 also carries a super structure or frame 26 which is open at its sides at 28. A seat 30 carried by frame 12, is disposed at the rear central portion of the tractor so that the operator has proper relation relative to the control levers and the steering wheel 32 mounted on the steering rod 34.

All of the tractor parts just described are conventional and it is not the purpose of the inventor to disclose any special tractor but to include any of the conventional types of tractor of this general form.

It is the primary purpose of this invention to so control the air flow created by the fan 24 or the natural flow of hot air from the engine in the direction of the operator whereby he is benefited by the heat developed by the internal combustion engine.

Mounted on axle housings 20 is an inverted U-shaped standard or bow 36 which is secured to said housings by means of cap screws 38. The legs 40 of member 36 are upwardly and inwardly inclined and provided with an arcuate head portion 42. It will be noted that this member 36 is so positioned relative to the seat 30 that the operator's legs will extend therebetween and due to the distance between the legs of the member 36 he will have easy access to and from the operative position.

Figure 2:
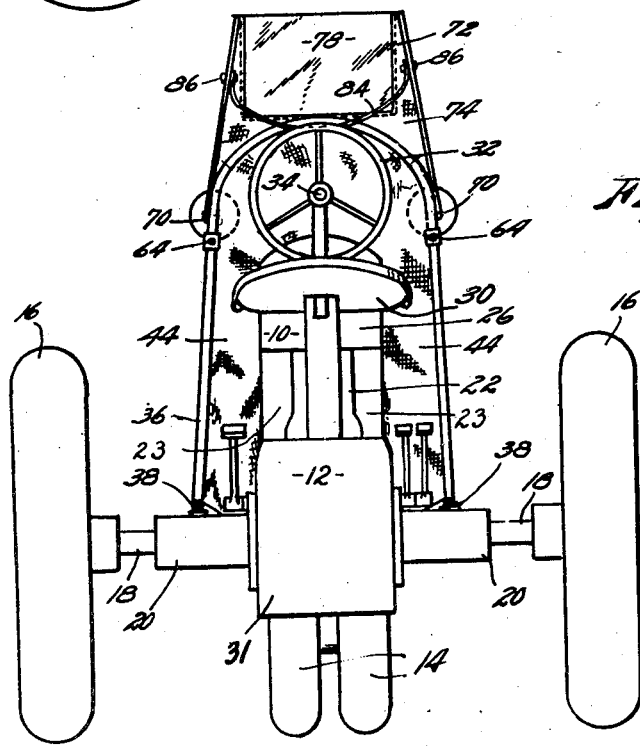
Fig. 2 is a rear end view of the mounted deflector in position on the tractor, as shown in Fig. 1.

A rear deflector member 44, shown in Figs. 1, 2 and 4, is made of a suitable flexible material such as canvas and is secured at its rear edge by folding it about the supporting member 36 and securing it in position by means of the snap fasteners 46 as clearly shown in Fig. 9. The forward edge of deflector 44 is secured to the tractor structure by means of snap-on fasteners 48 and 50. The opposite edges of deflector 44 are each provided with a series of eyelets or gromets 52; one series of these eyelets are adapted to receive cords 54, looped at their free end 56 and provided with an adjusting block 58 by means of which the length of the cord may be varied. The loop of each of said cords carries a hook member 60 which is adapted to pass beneath the tractor frame and engage the eyelets 52 at the opposite edge of the deflector member 44. This fastening of the deflector member is such that it substantially closes the rear portion of the tractor to present a housing suitable to receive the extremities of the operator and to direct the heated air toward the tractor seat 30. The bottom portion 31 of the vehicle traversed by the cords 54 is closed and serves to prevent the escape of heated air.

It will be noted that the deflector 44 is slit at 62 to receive the lamp arms 64 carried by the legs 40 of member 36. A flap 66 attached to member 44 overlaps slot 62 and is provided with snap-on fasteners 68 by means of which the canvas is secured about the arms 64. Light reflector brackets 70 are adjustably carried by arms 64.

The wind shield section 72 comprises a canvas section 74 formed to fit over the rear portion of deflector member 44 and to be secured thereto by fasteners 76 which serve to support the transparent section 78 made of plastic or any other suitable material in a substantially vertical position. The opposite edges of the wind shield sections are provided with folded over hems to form tubes 80 to receive reenforcing stays or slats 82. An arcuate reenforcing cross bar 84 received at its opposite end to stays 82 by bolts 86 serve to hold the wind shield section in proper position. This windshield section may be quickly mounted or dismounted by simply releasing the fasteners.

Referring now to a front deflector member 88 it will be noted that it has two similar side sections 90 and a bottom section 92. The side sections extend forwardly beyond the front edge of the bottom section 92 to form a notch 94 with inturned flaps 96, each flap being provided with an eyelet 98. An adjustable fastening cord 54 is secured at its one end in the eyelet 98 in one of said flaps and the hook 60 carried thereby is adapted to engage in the eyelet of the other of said flaps. The bottom section 92 is provided with an opening 100 of proper size and position to snugly fit the depending portion 102 of the engine 22 when the side sections are positioned as shown in Figure 1 to cover the side openings of the engine. The rear edge of said sections 90 overlap the front edge of rear deflector member 44 and the holes 104 engage the fastener stud 50. Snap fasteners 106 at the top and front edge of side sections 90 serve to support the canvas in position over the openings 22 to prevent the escape of hot air from the engine compartment.

The snap fasteners are of the conventional type wherein an eyelet is adapted to frictionally receive a stud for removably holding the parts together.

Referring to Figure 1 it will be noted that the upper front corner of the side member is shown dropped down in solid lines to permit the escape of a portion of the hot air in order to temper the air being delivered to the operator. When it is desired to obtain the full benefit of the air heated by the engine the corner portion of the side member is raised and fastened as shown in dotted lines. By removing the entire front deflector section 88 the rear deflector member will still deliver heated air from the engine to the operator in a less degree.

In most farm engines that portion of the frame adjacent the engine is open while the rear portion of the frame is closed by the transmission, differential, etc. For this reason the bottom section 92 is provided to substantially close the engine compartment as described.

It will be noted, by referring to Fig. 2 that the engine 22 is relatively narrower than the upper frame part 26 and is spaced apart from the deflector 88, thus presenting passageways 23 between the engine and the deflector to form an air passageway from the engine zone to the bow 36 through which air passing about the heated engine will pass rearwardly to the seat zone.

The deflectors 88 and 44 are attached at their overlapped portions to the upper frame part 26 at 50 and to the lower frame part 12 at 98 thus insuring a continuous deflector or cover from adjacent the forward end of frame 26 to the bow 36 through which heated air may pass to the seat zone.

From the foregoing description it is apparent that the hot air deflector members in combination with the farm tractor structure produce passageway for the hot air generated by the engine of the tractor from the engine to the rear of the tractor to facilitate heating of the area occupied by the operator; furthermore, it is quite apparent that minor changes might be made in the structures and arrangements of the parts without departing from the spirit of the invention.

What I claim as new and desire to cover by Letters Patent is:

1. The combination with a tractor including an open conventional frame carrying an engine, a ventilating fan driven by said engine and a seat structure carried by said frame at the rear of said engine, of a pliable deflector member detachably secured to said open frame to close the same about said engine, a bow secured at its lower ends to said frame adjacent said seat structure and extending above the top of said frame, a pliable deflector member secured at its rear edge portions to said bow and at its front edge portion to said frame to overlap said first named deflector whereby hot air from said engine will be caused to travel to the zone of said seat structure.

2. The combination with a conventional tractor including an open conventional frame carrying an engine, a ventilating fan driven by said engine and a seat structure carried by said frame at the rear of said engine, of a pliable deflector member detachably secured to said open frame to close the same about said engine, a bow secured at its lower ends to said frame adjacent said seat structure and extending above the top of said frame, a pliable deflector member secured at its rear edge portions to said bow and at its front edge portion to said frame to form with said first named deflector a continuous passageway rearwardly from said engine whereby substantially all the hot air from said engine will be caused to travel to the zone of said seat structure, and a wind shield detachably carried by said bow to extend thereabove.

3. The combination with a tractor including an open conventional frame, an engine mounted within said frame, a ventilating fan driven by said engine, a seat structure carried by said frame at the rear of said engine, of a pliable deflector member detachably secured to said frame about said engine to close said frame, a bow carried by said frame adjacent said seat structure, a rear pliable deflector member supported at its front edge portion to said frame and at its rear edge portion to said bow whereby a continuous passageway is formed from the front end of said tractor to the seat zone through which air is forced by said fan over said engine to the area of said seat.

4. The combination with a tractor including a frame having open sides, an engine mounted within said frame, a ventilating fan driven by said engine, a seat structure carried by said frame at